Aug. 8, 1950 W. B. McLEAN 2,518,162
LOAD EQUALIZING MEANS FOR WHEELS OF MOVING STRUCTURES
Filed Oct. 25, 1944 5 Sheets-Sheet 1
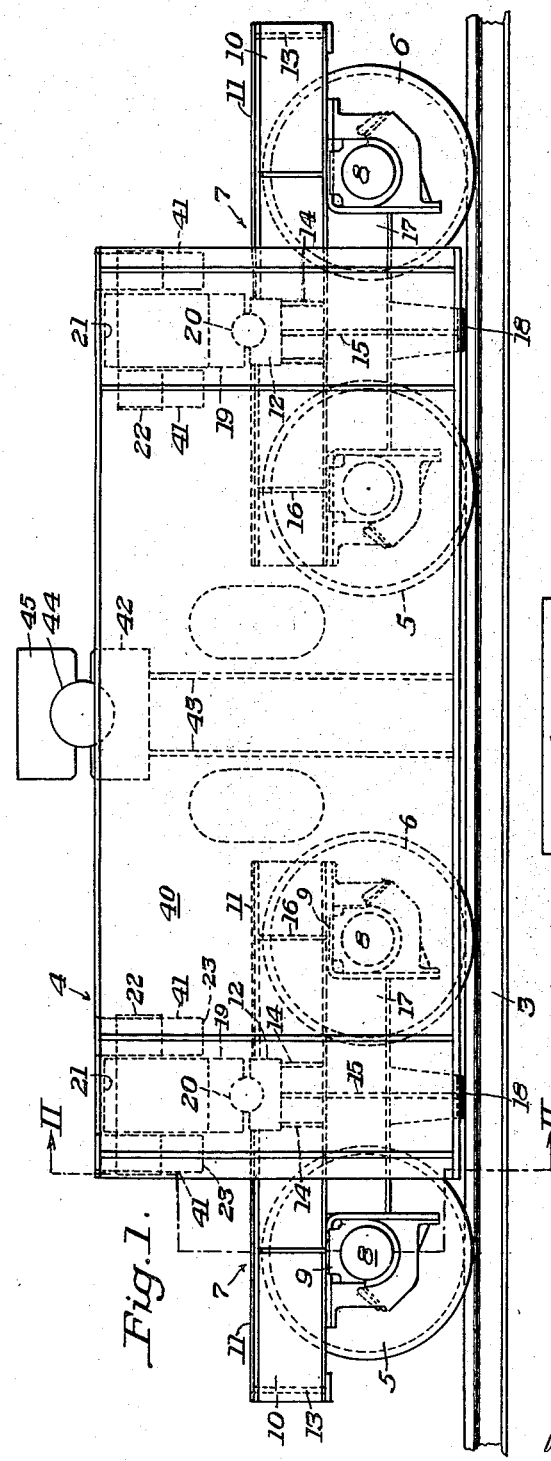
INVENTOR
William B. McLean
by Christy, Parmelee and Strickland
his attorneys Aug. 8, 1950 W. B. McLEAN 2,518,162
LOAD EQUALIZING MEANS FOR WHEELS OF MOVING STRUCTURES
Filed Oct. 25, 1944 5 Sheets-Sheet 2
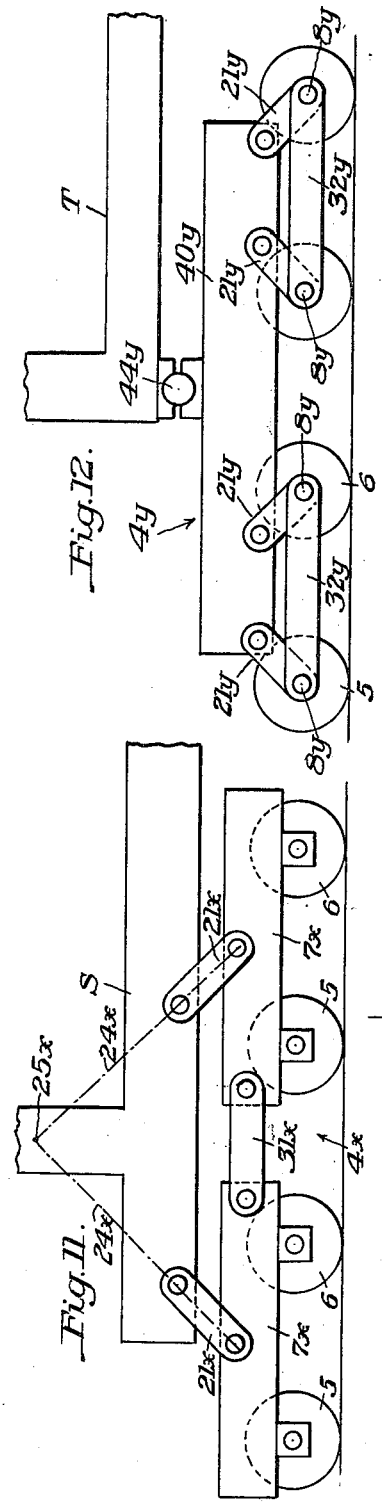
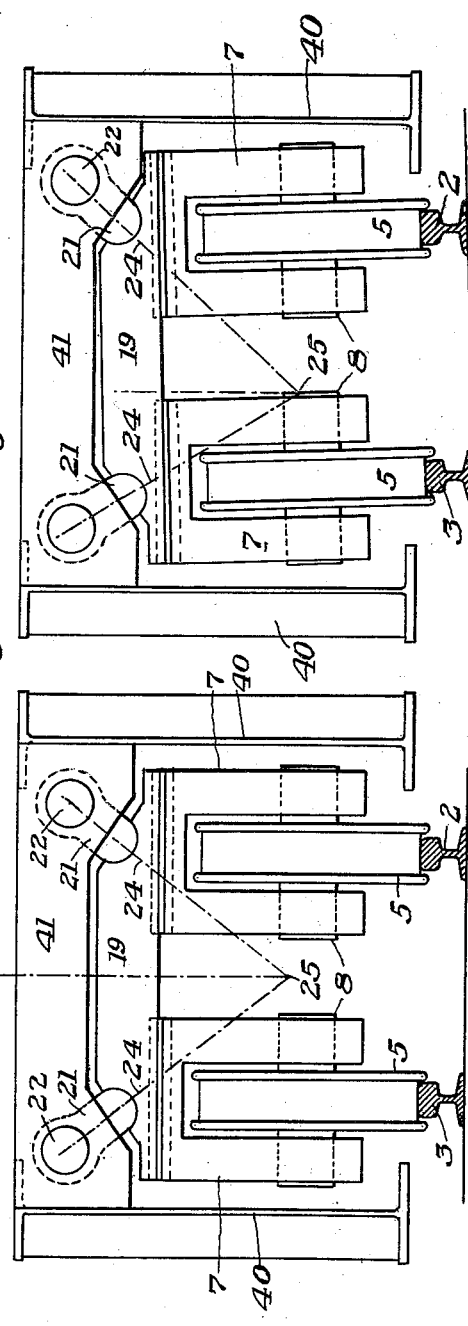
INVENTOR
William B. McLean
by Christy, Parmelee and Strickland
his attorneys Aug. 8, 1950 W. B. McLEAN 2,518,162
LOAD EQUALIZING MEANS FOR WHEELS OF MOVING STRUCTURES
Filed Oct. 25, 1944 5 Sheets-Sheet 4
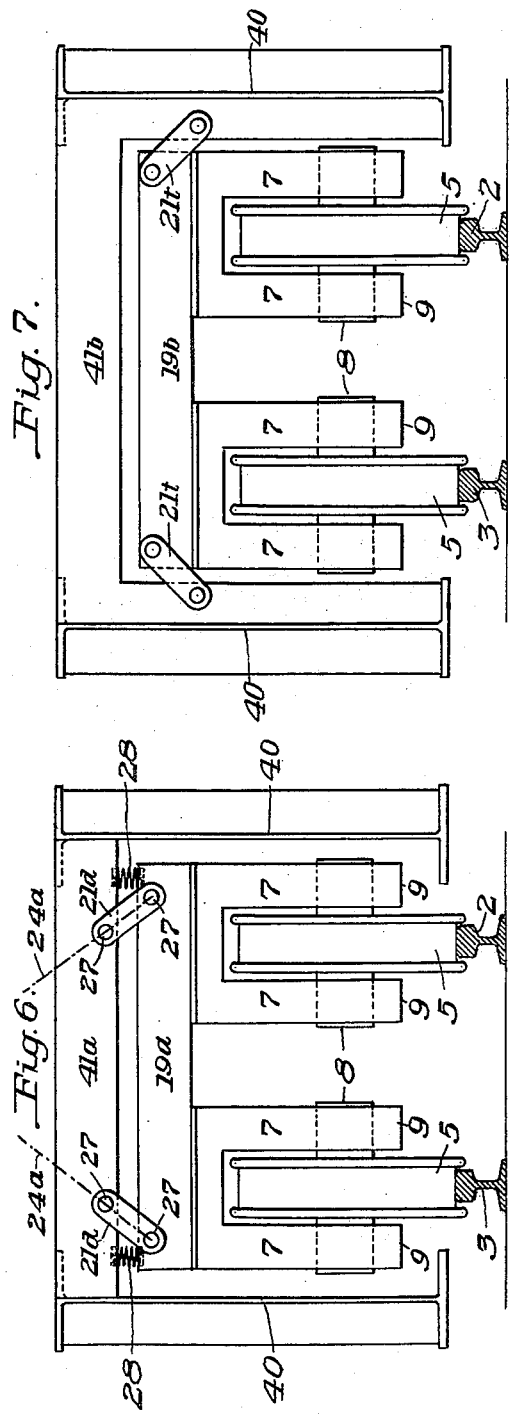
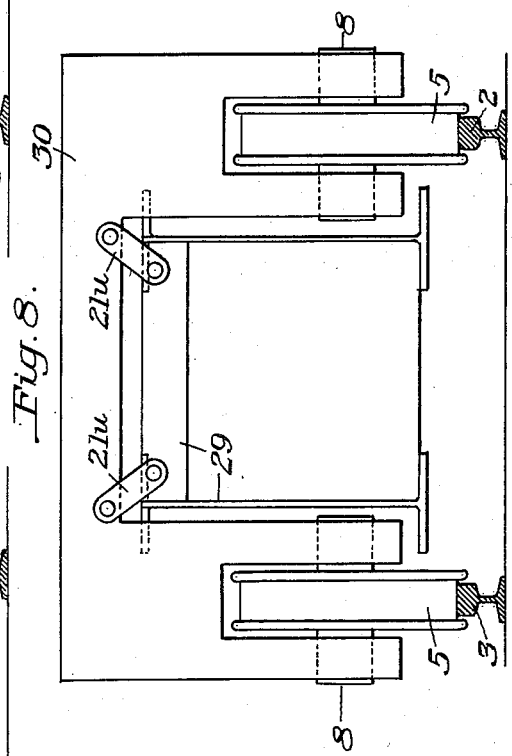
INVENTOR
William B. McLean
by Christy, Parmelee and Strickland
his attorneys Aug. 8, 1950 W. B. McLEAN 2,518,162
LOAD EQUALIZING MEANS FOR WHEELS OF MOVING STRUCTURES
Filed Oct. 25, 1944 5 Sheets-Sheet 5
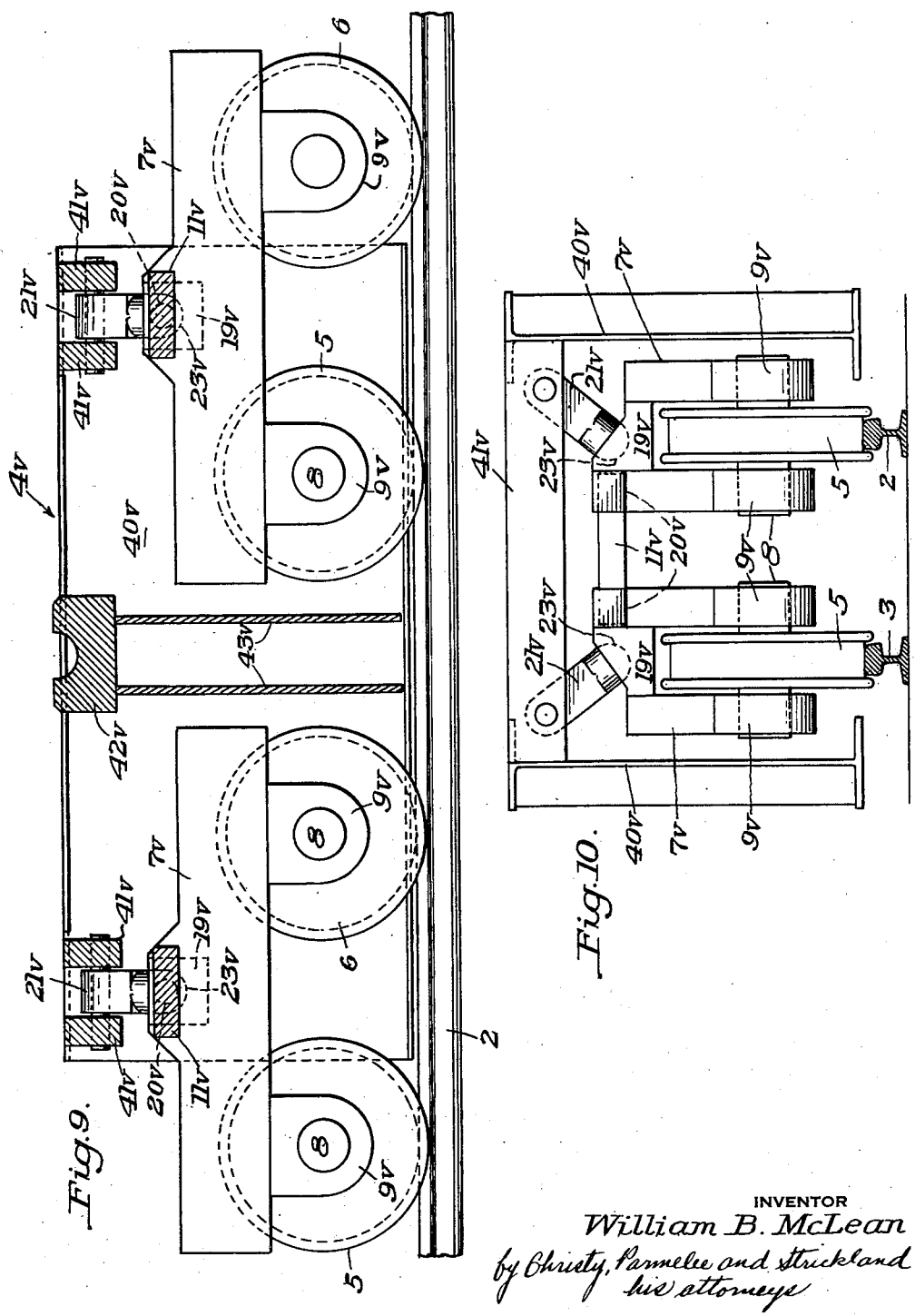
INVENTOR
William B. McLean
by Christy, Parmelee and Strickland
his attorneys Patented Aug. 8, 1950

2,518,162

UNITED STATES PATENT OFFICE 2,518,162

LOAD EQUALIZING MEANS FOR WHEELS OF MOVING STRUCTURES

William B. McLean, Coraopolis Heights, Pa., assignor to Dravo Corporation, Pittsburgh, Pa., a corporation of Pennsylvania Application October 25, 1944, Serial No. 560,323

4 Claims. (Cl. 105—209)

My invention relates to structures that travel on wheels, and is directed to certain new and useful improvements in means for distributing and maintaining substantial equality of load on the several wheels that support such structures.

The invention is more particularly concerned with structures that travel on two pairs of wheels, or on greater multiples of paired wheels than two, with the pairs of wheels arranged in spaced relation in the direction of vehicle travel, such as the paired wheels of automobiles, motor buses, motor trucks, and the like, that travel on highways; or the paired wheels of locomotives, railway cars, gantry cranes, ore bridges, and the like, that travel on railways, as well as turret cranes that are mounted to travel or rotate on rails laid in a circle on the deck of a floating barge, or other support.

In the accompanying drawings and ensuing specification, the invention is illustrated and described in association with the wheel trucks or carriages of a turret crane for a floating barge or ship, and upon considering the exemplary embodiments of the invention for this field of service, for which the improvements have been especially designed and have proved particularly advantageous, the adaptability of the load-distributing means of the invention to various types of traveling structures will be readily perceived by those skilled in the art.

In the drawings:

Figure 1 is a view in side elevation of one of the wheel trucks or carriages of a turret crane of the type that is mounted upon circular rails on the deck structure of a barge, and in this truck or carriage a presently preferred form of the load-distributing means of the invention is incorporated;

Figure 2 is a view of the truck or carriage structure on the plane II—II of Figure 1;

Figure 3 is a view in outline of the end of the structure of Figures 1 and 2, indicating the positions of the parts when there is normal equality of load on the several wheels of the structure;

Figure 4 is a view comparable with Figure 3, but showing the positions which the parts assume to maintain substantial equality of load on the wheels when conditions arise that tend to disturb load equalization;

Figures 6, 7 and 8 are views comparable with Figure 3, each illustrating a variation in the organization of the load-distributing members;

Figure 9 is a view in medial, longitudinal section of a further modification in the distributing or equalizing means of the invention;

Figure 10 is a view in end elevation of the structure of Figure 9; and

Figures 11 and 12 are diagrammatic views, illustrating two other modifications.

Figure 5:
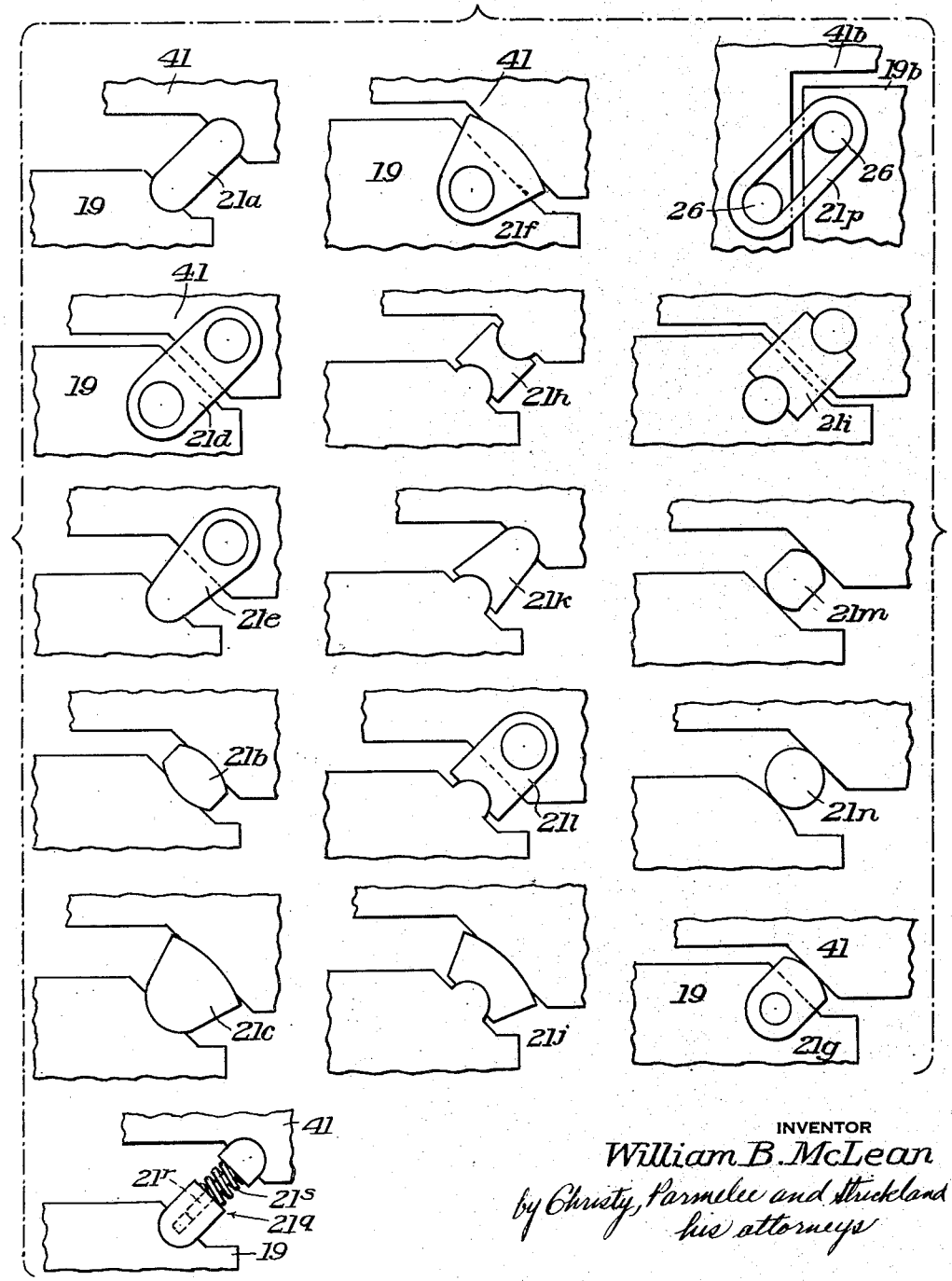
Figure 5 is a diagrammatic view, illustrating several modified forms of the load-distributing or equalizing members that may be utilized in the structural organization of the invention.

Referring to the drawings, the reference numerals 2 and 3 are applied to a pair of rails, which will be understood to be laid in concentric circles upon the deck structure of a floating barge or ship. Riding upon these rails are the wheel trucks or carriages 4 (only one is shown in the drawings, but it will be understood that ordinarily four are provided) which form a turntable-like support for the platform or turret of a marine crane. The platform or turret (not shown) carries the usual crane jib, and houses the usual crane machinery, operator's cab and controls. The invention is centered in means arranged in the truck or carriage structure, whereby the load on the several wheels of each truck will be substantially equalized, regardless of such variations in load application as would otherwise be caused by the weight of the work load lifted by the crane; or by changes in position of the turret and/or the crane jib; or by changes in the position of the barge due to waves or swells in the body of water which sustains or floats the barge; or by irregularities in the bodies of the tracks which support the crane structure for its turntable-like movement.

In general, each truck or carriage 4 consists of a main equalizer of girder-like construction formed of a pair of spaced or I-beams 40, 40 of steel that are united at each end by a pair of spaced transverse cross beams 41, 41, and are united at the middle by a medial cross beam supporting a bearing block 42, and transverse plates 43. The union of the structural steel parts is effected by welding. At its two ends the main equalizer is borne upon two sets of wheels, there being two pairs of wheels in each set. One pair of wheels 5, 5 of each set may for convenience be termed the front wheels, and the other pair of wheels 6, 6 may be termed the rear wheels.

Set in the bearing block 42 is a cylindrical pin 44 that provides the immediate seat for a bearing block 45 incorporated in the turret platform or base of the crane. There is a bearing block 45 for each of the carriage or truck units on which the crane structure is supported, and the several carriages or trucks provide a support that permits the crane structure to rotate in its entirety on the barge, the wheels of the trucks or carriages traveling on the circular rails 2 and 3. It will be manifest that by virtue of the pivotal support (44) of the weight of the crane structure on the middle of the main equalizer beams 40, 40 of each carriage or truck, there is obtained an equalization of the supported load as between the two sets of wheels at the opposite ends of the main equalizer.

Additionally it is desirable, if not essential, that provision be made for substantially equalizing the load on the several wheels of each set, and this equalization is desirably effective not in one direction only, but in both longitudinal and transverse directions. Stated in other words, means are provided for maintaining substantial equality of load as between the front and back wheels of each set, as well as between the two wheels that form each pair of wheels in the sets.

In accordance with my invention, the essential load-equalizing or distributing means comprise two load-sustaining members that are movably secured in assembly between the supported crane structure and the wheels. These members are arranged to transmit to the wheels, or to the wheel bearing elements, the weight of the supported crane structure, and this weight is transmitted by the two members on lines of force that extend angularly to each other to a point of intersection, as will more fully appear in the ensuing specification. These two equalizer members are movable in response to any variation in the load-application to the structure, and such movement of the members is accompanied by a change in the angularity of said lines of force, and a shift of said point of intersection of the lines of force, with the effect that equality of load among the several wheels is maintained.

Turning to a more detailed consideration of the illustrated embodiment of the invention, it will be understood that the two pairs of wheels of each set are rotatably mounted in two truck members 7, 7, one front wheel 5 and one back wheel 6 of each pair being mounted in each truck member. Each wheel is secured on an axle 8 that is journaled in bearings 9, 9 provided in the truck members.

Each truck member is constructed of body or frame formed of two parallel I-beams 10, 10 that are integrated by the welded assembly thereto of top plates 11, 11, a transversely extending medial bearing block 12, and transverse plates 13, 14, 15 and 16. The bearings 9, 9 (or the journal boxes that house them) are reinforced in their assembly upon the nether edge of each beam 10 by means of a beam element 17, and the two beam elements 17 of each truck member 7 are transversely spanned from below by a rigid cradle portion 18 that receives in welded union the lower end of the vertically extending transverse plate 15 which, with the plates 14, reinforces the bearing block 12. Thus, two truck members 7, 7 provide the mounting for the two pairs of wheels at each end of the main equalizer.

The two truck members 7, 7 that mount the two pairs of wheels of each set are interconnected by a transverse body member or master beam 19, and the interconnection of the truck members is secured by means of cylindrical pivot pins 20 nested in semi-cylindrical sockets formed respectively in the tops of the bearing blocks 12 of the truck members and in the bottom of the master beam 19. The weight of the supported crane structure is, as presently will be shown, imposed on the master beam 19, and under the effect of such weight the master beam's engagement with the elongate axially aligned pivot pins 20 of the two truck members provides absolute security against the truck members tilting relatively to one another as viewed in Figure 2, while at the same time permitting ready tilting of the trucks individually on their pivots 20, to afford equalization of the load as between the front wheel 5 and the rear wheel 6 of each truck member, this effect being known as the longitudinal equalization of the load on the wheels, whereas the effect obtained by the tilting of the main equalizer on the pivot 44 affords the longitudinal equalization of the load as between the two sets of wheels.

In the same manner as the elongate pins 20 are effective in their nested position between the load-bearing blocks 12 and 19 to prevent the relative tilting of the truck members 7, 7, the elongate pin 44 nested between the load-bearing blocks 42 and 45 is effective to maintain transverse stability of the entire carriage structure 4.

Whereas it is desirable in the truck or carriage structure to obtain the transverse stability described of the main equalizer and of the individual wheel-equipped truck members, it is requisite, as has been already indicated, that provision be made for substantial equalization of load as between the wheels on the two truck members 7, 7. It is the particular organization of means to this end that constitutes an important feature of the invention.

Such means consist in two load-sustaining members 21, 21 arranged at each end of the main equalizer. The members 21, 21 comprise links that are positioned between, and pivoted (as at 22) to, the two spaced beams 41, 41, and the links are spaced apart transversely of the truck or carriage structure. Extending in downwardly inclined position from between the beams 41, 41, the links are provided with semi-cylindrical terminals that are received in correspondingly shaped sockets 23 in the master beam 19. Thus, the entire load supported by the truck or carriage structure 4 is transmitted through a pair of links 21, 21 at each of the two ends of the main equalizer to the two sets of wheels described.

It is important to note that the load is transmitted by each pair of links on angularly converging lines of force 24, 24, as indicated in Figures 3 and 4, and these lines of force intersect at a point 25, which is the momentary center of the resolved force components. In Figure 3 the conditions are illustrated which prevail when the rails (borne on the deck of a floating barge) lie in dead horizontal position, with the supported load uniformly distributed transversely of the truck or carriage structure. Under such conditions the momentary center or point of intersection 25 of the lines of force is located in the vertical midplane of the carriage structure. When, however, the rails on their floating support move out of horizontal position, or when there is such a variation from uniform application or distribution of the weight of the supported crane structure as tends to tilt or shift the carriage 4 transversely of the tracks 2, 3, the load-sustaining links 21, 21 swing simultaneously on their pivots and permit a relative tilting movement between the main equalizer and the truck members 7, 7, with the effect that substantial equality of load on the wheels is maintained. This relative tilting movement between the main equalizer and the truck members may take effect in either direction transversely of the tracks, depending upon the direction in which the rails on the floating barge tilt from the horizontal, and/or the direction in which a variation in the distribution of the supported weight occurs. It will be manifest that the load-equalizing swing of the pair of links 21, 21 is accompanied by a change in the angularity of the lines of force 24, 24, together with a horizontal movement of the point of intersection 25. In Figure 4, a typical load-redistributing adjustment of the parts is illustrated, and upon consideration of this showing the engineer will readily understand the manner in which the structure operates to effect substantial equalization of the load transversely of the wheels at each end of the main equalizer. This transverse load-distributing or equalizing action, together with the longitudinal equalizing actions of the individual truck members and of the main equalizer, insures substantial equality of the load on all of the wheels of the carriage 4. And so it is with every carriage included in the mounting for the crane structure.

In passing it may be remarked that the angularly disposed links 21, 21 stand in compression under the weight of the supported crane structure, and that the supported structure above them is in unstable equilibrium, whereby a restraining force is for obvious reasons required. Such restraining force is obtained by making the pivot pin 44 relatively long, as shown in Figure 2, so as to prevent the transverse tilting of the main equalizer relatively to the supported crane structure.

It will be noted that the transverse movement of either pair of truck members 7, 7 relatively to the main equalizer may be controlled as need be, by properly determining the length of the links 21, 21. Additionally, it may be noted that the horizontal movement of the wheels on the rails due to the transverse tilting about the point 25 is dependent upon the height of this point above the heads of the rails. This height of the point 25 above the rails may be regulated by suitably determining the slope of the load-sustaining links.

It is further important to observe that, by virtue of the structural organization described, the wheel loads are transmitted by the links 21, 21 outward to the beams or girders 40, 40 of the main equalizer. In prior truck or carriage structures of the types within the purview of my invention the forces react from the wheels first inwardly to a central equalizing pin and then outwardly to the main equalizer beams. The more direct force transmission afforded by my construction, permits the main equalizer beams to be arranged upon the opposite sides of the truck members 7, 7, in such manner that the over-all height of the carriage or truck structure may be lower and of less weight than heretofore has been possible. The structure provides maximum compactness, ruggedness, and efficiency, with minimum overturning tendency under lateral or transverse loads, and minimum lateral movement of the wheels due to load-equalizing action.

The load-sustaining equalizing members 21, 21 may take a great variety of forms without departing from the essential characteristics of the invention described. Referring to Figure 5, the member 21a is a compression link that is of semi-cylindrical shape at both of its opposite ends, and is engaged in sockets formed respectively in the main equalizer cross beams 41, 41 and the master beam 19 of the paired trucks. This illustrates that each pair of transverse load-equalizing members may be formed as rocker-like elements. The members 21b and 21c show variations in the form of the rocker-like elements, whereas the element 21d illustrates that the links may be articulated on pivot pins at both of their ends. The member 21e provides a diagrammatic showing of the form of links 21 embodied in the carriage structure described above, while at 21f and 21g are shown rocker elements that are pivoted at one end to the master beam 19 and at opposite end engage the main equalizer beams 41, 41 with rocking effect. The pivotal or rocking effect desired may also be obtained by forming the semi-cylindrical sockets in the link members themselves and forming or mounting the complementary semi-cylindrical knobs on the beam members, as indicated at 21h, and 21i, or by having the links include a socket at one end and a knob at the other, with the beams correspondingly formed with semi-cylindrical knobs and sockets, as illustrated at 21j and 21k. At 21l a link is shown that is pivoted at one end, and at opposite end is provided with a knob-and-socket joint. In still further modification the links may consist of rollers, as shown at 21m and 21n. In each of the structures described the links are under compression and operate in the manner described, with the lines of force inclined to one another to a point of intersection. In some cases, as will be shown in the following passages of the specification, the links may comprise tension elements, rather than compression elements, and such a link is shown at 21p. It comprises an open chain-like link mounted upon pivot pins 26 carried by the main equalizer cross beams 41b and the truck master beam 19b, respectively.

While all the forms of links mentioned thus far are rigid, it will be understood that in some cases the links may be elastic, or elastic linkages, as shown in exemplary way at 21q in Figure 5, where a link is shown formed in two parts that are severally shaped at their ends for engagement in semi-cylindrical sockets in the cross beams 41, 41 and the master beam 19. The two parts are assembled by means of a pin 21r which is rigid with the upper part and telescopically slideable in the lower part. A compression spring 21s is interposed between the link parts, and thus a desired degree of resilience may be obtained without loss of the essential load-equalizing or distributing action described.

Referring to Figure 6, a modification in the arrangement of the load-equalizing links in the truck or carriage structure is illustrated. The links 21d are pivoted on pins 27 to the main equalizer cross beams 41a and to the master beam 19a of the truck members, and a feature to be noted is that the links are so inclined that the lines of force transmission 24a, 24a intersect at a point above the main equalizer, with the consequence that the structure supported on the carriage will rest in unstable equilibrium; that is, unless the center of gravity of the supported structure is located at a considerable distance below such point of intersection of the lines of force. In order to restrain the structure in a position of equilibrium, springs 28 are interposed between the main equalizer structure and the wheel-supporting truck structure; for example, between the beams 41a and 19a, as shown. Thus, the desired transverse equalizing action of the wheels is obtained. It will be understood that when a vehicle, say a motor vehicle, or a railway car, or the like, is provided with the equalizing means of Figure 6, with the center of gravity of the supported structure below the point of intersection of said lines of force, the centrifugal force acting on the supported structure in rounding a curve will operate through the transverse equalizing links to provide an automatic banking action; that is, the supported structure will be canted toward the center of curvature through which the vehicle is traveling. The value of this feature is self evident to those skilled in the art.

In Figure 7 the equalizing links 21t are arranged in tension between the cross beams 41b of the main equalizer and the master beam 19b of the truck members. Of the many forms which these tension links may take, I show only the solid pin construction 21t of Figure 7, and the chain-link construction 21p of Figure 5. In arrangement of the type shown in Figure 7, the structure is in substantial equilibrium irrespective of whether the center of gravity is above or below the point of intersection of the lines of force.

Figure 8 illustrates that the main equalizer may consist of a beam or girder structure 29 which is at its ends suspended within the truck members. In this case the truck members at each end of the main equalizer are constructed as a rigid frame 30 of inverted U-shape, and the equalizer links 21u are pivotally connected in upwardly and outwardly inclined positions between the main equalizing girder and the truck member. The frame 30 at each end of the girder 29 may carry two wheels, a front wheel and a rear wheel, in each leg of its inverted U-shaped body, and each of such legs may be arranged in pivotal assembly with the cross-arm of the U. For example, a pivotal joint, such as the joint 12, 19, 20 between each truck and the end of the main equalizer 40 of Figure 1, may be provided between each leg and the base of the inverted U-shaped frame 30, so that longitudinal equalizing movement of the wheels in each truck member may be obtained.

It will be understood that the main equalizer girder 29 will be provided at its mid-point with load-sustaining blocks and a pivot pin, such as the blocks 42, 45 and the pin 44 of the structure shown in Figures 1 and 2, whereby the truck or carriage structure will provide longitudinal equalization of load as between the sets of wheels at the two ends of the main equalizer.

It is contemplated that the main equalizer of the structure may itself be the principal supported load that is borne at its opposite ends upon truck mountings of the invention. That is to say, the main equalizer (40, 41, etc.) of Figure 1, or the main equalizer 29 of Figure 8 may comprise the body of a railway car, for example, whereby the railway car would have the load-equalizing advantages described, and particularly would have the automatic banking action, above referred to.

In some cases both transverse and longitudinal equalizing of the load on the wheels at each end of the truck or carriage structures may be obtained through the instrumentality of the links arranged in load-sustaining position between the main equalizer and the truck members. Such an elaboration is illustrated in Figures 9 and 10. The two pairs of wheels 5, 5 and 6, 6 at each end of the main equalizer, which is formed of girders 40v, 40v, cross beams 41v, 41v, and transverse bearing blocks 42v, are mounted in bearing blocks 9v in paired truck members 7v. The truck members are provided with bearing blocks 19v that are severally provided with semi-spherical sockets 23v, and the equalizing links 21v, pivoted to the cross beams 41v of the main equalizer, are formed with semi-spherical ends that are engaged in said socketed bearing blocks. The effect of these links is exactly that described of the organization of Figures 1 to 4 in maintaining substantial equality of load as between the wheels of the two truck members 7v, with the additional characteristic that the truck members are, by virtue of the ball-and-socket engagement of the links 21v with the blocks 19v, adapted to tilt longitudinally and provide equalization of load as between the front and back wheels of each truck member.

The two truck members at each end of the main equalizer of this carriage structure 4v are supported to withstand the transverse horizontal thrust created by the loaded links 21v, and the means for this purpose comprise a thrust block 11v which carries trunnions 20v rotatably secured in the bodies of the associated truck members, as shown. The truck members are free to tilt both longitudinally and transversely with respect to the main equalizer, and are adapted to maintain substantial equality of load as between all wheels mounted therein. And the main equalizer operates as in the structure of Figures 1 to 4 to equalize the load as between the sets of wheels at the two extremities of the carriage structure.

In many truck or wheel carriages of traveling structures, the driving gears, and sometimes the motor too, are assembled in the carriage structure proper. This convential practice may be followed in the truck or carriage structures illustrated herein.

The organization of the inclined load-sustaining links of my invention may be used for effecting longitudinal equalization of load as between the two longitudinally spaced truck members which cooperate to sustain the weight of a traveling structure, and as between the front and rear wheels of each truck member. Considering Figure 11 it will be understood that a truck or carriage assembly 4x is arranged to bear all or part of the weight of a supported structure S. Each of the two truck members 7x, 7x mount a pair of front wheels 5, 5 and a pair of rear wheels 6, 6. A proportionate part of the weight of the supported structure is transmitted to the center of each truck member by means of a pivoted link 21x. The links are inclined, and the resultant lines 24x of force transmission intersect at a point 25x. In order to prevent the spreading apart of the truck members under the horizontal components of the transmitted forces, the two truck members are articulated by means of a pivoted bar 31x. Manifestly, this structure will permit each truck member to tilt longitudinally about the point of pivotal attachment to the associate link 21x, to provide load equalization as between the front and rear wheels of the truck member, while one truck member may move vertically relatively to the other to permit uniform distribution of load as between the two truck members. The latter action is accompanied by angular movement of the two links, with a change in angularity of the force lines 24x and an approximately horizontal shift of the point 25x.

In still further modification, Figure 12 illustrates that a supported structure T may bear through a pivot pin or ball 44y upon the mid-point of the main equalizer 40y of a truck or carriage 4y. Two pairs of wheels are provided at each end of the main equalizer, and each pair of wheels is secured upon an axle 8y that projects outward at each end from the adjacent wheel and is engaged pivotally by a link 21y, and the ends of the axles of the two pairs of wheels at each end of the main equalizer are pivotally connected by tension rods 32y. The paired links 21y at each end of the carriage structure are inclined upwardly, as shown, and are pivotally connected to the body of the main equalizer. This organization of links affords a substantial longitudinal load equalization as between the two pairs of wheels at each end of the carriage structure, and the tilting movement of the main equalizer on the pivot 44y provides longitudinal load equalization as between the two sets of four wheels. In the arrangement of load-equalizing links of Figure 12, the same relation of stress lines exists as in the case of all of the various arrangements described.

Within the terms and intent of the appended claims still other modifications, variations and refinements are held in contemplation.

I claim:

1. A truck comprising two truck members arranged substantially abreast and each including a body in which a plurality of wheels are journaled in tandem or longitudinally spaced relation, a transverse master beam pivotally engaging and interconnecting said truck members for individual longitudinal load-equalizing movement, and means for transmitting load to said truck comprising two mechanical links extending angularly from said master beam at points spaced apart transversely of the truck and providing compression members for transmitting load to the master beam on lines of force that extend angularly to a point of intersection, said links being angularly movable in response to variations in load application to the truck to provide substantial transverse equalization of the load as between the two truck members.

2. A structure of the class described comprising an equalizer beam adapted pivotally to sustain a movable load, said beam having at longitudinally spaced points two trucks, each truck comprising two truck members arranged substantially abreast and each including a body in which two wheels are journaled in longitudinally spaced relation and independently of the wheels in the companion truck member, a transverse member extending between and pivotally engaging said truck members to permit longitudinal tilting movement of either truck member relatively to the other, and means for transmitting to said transverse member part of the load sustained by said equalizer beam, said means comprising two mechanical links pivotally interconnecting said equalizer beam and said transverse member, said links being spaced transversely of the truck structure and extending angularly to one another for transmitting load on lines of force that extend to a point of intersection, said links being angularly movable in response to variations in load distribution to provide substantial transverse equalization of the load as between the two truck members.

3. A structure of the class described comprising an equalizer beam adapted pivotally to sustain a movable load, said beam having at longitudinally spaced points two trucks, each truck comprising two truck members arranged substantially abreast and each including a body in which two wheels are journaled in longitudinally spaced relation and independently of the wheels in the companion truck member, a transverse member, pivot means comprising a pin extending transversely of the truck structure for articulating each truck member to said transverse member, and means for transmitting to said transverse member part of the load sustained by said equalizer beam, said means comprising two mechanical links pivotally interconnecting said equalizer beam and said transverse member, said links being spaced transversely of the truck structure and extending angularly to one another for transmitting load on lines of force that extend to a point of intersection, said links being angularly movable in response to variations in load distribution to provide substantial transverse equalization of the load as between the two truck members.

4. A railway truck assembly comprising an equalizer structure borne at longitudinally spaced points upon two trucks, said equalizer structure comprising a girder-like construction having two side members extending between and arranged on the opposite outer sides of said trucks, two end cross beams and a medial cross beam uniting said side members, a pivotal bearing located on said medial cross beam to sustain a movable load while providing for longitudinal tilting of the equalizer structure, each of said two trucks comprising two truck members arranged substantially abreast, each truck member having a body in which two wheels are journaled in longitudinally spaced relation independently of the wheels in the companion truck member, a medial transverse member extending between and pivotally interengaging said truck members to permit longitudinal tilting movement of either truck member relatively to the other, and means for transmitting to both of said trucks the movable load pivotally sustained by said equalizer structure, said means comprising two pairs of mechanical links severally interconnecting the end cross beams of said equalizer structure with the medial transverse members of said trucks, the links of each pair being spaced apart transversely of the associated truck and extending angularly to one another for transmitting load on lines of force that extend to a point of intersection, the links of each pair being angularly movable in response to variations in load distribution to provide substantial transverse equalization of the load between the two truck members of the truck.

WILLIAM B. McLEAN.

REFERENCES CITED

The following references are of record in the file of this patent:

UNITED STATES PATENTS

| Number | Name | Date |
|---|---|---|
| 65,788 | Allen | June 18, 1867 |
| 241,104 | Westlake | May 3, 1881 |
| 758,228 | Westlake | Apr. 26, 1904 |
| 805,105 | Timmis | Nov. 21, 1905 |
| 1,436,205 | Sloane | Nov. 21, 1922 |
| 1,656,995 | Wenzel | Jan. 24, 1928 |
| 1,708,046 | Benton | Apr. 9, 1929 |
| 1,858,473 | Taylor | May 17, 1932 |

FOREIGN PATENTS

| Number | Country | Date |
|---|---|---|
| 174,741 | Germany | Sept. 24, 1906 |
| 302,552 | England | Dec. 30, 1928 |
| 306,552 | Germany | June 28, 1918 |
| 426,026 | Great Britain | Mar. 26, 1935 |
| 840,650 | France | Jan. 23, 1939 |